(12) United States Patent
Yabe (10) Patent No.: US 12,454,980 B2
(45) Date of Patent: Oct. 28, 2025

(54) MULTI-ROW BEARING AND BEARING UNIT

(71) Applicant: NSK LTD., Tokyo (JP)

(72) Inventor: Takayuki Yabe, Kanagawa (JP)

(73) Assignee: NSK LTD., Tokyo (JP)

( * ) Notice: Subject to any disclaimer, the term of this patent is extended or adjusted under 35 U.S.C. 154(b) by 75 days.

(21) Appl. No.: 18/285,137

(22) PCT Filed: Mar. 29, 2022

(86) PCT No.: PCT/JP2022/015548
§ 371 (c)(1),
(2) Date: Sep. 29, 2023

(87) PCT Pub. No.: WO2022/210734
PCT Pub. Date: Oct. 6, 2022

(65) Prior Publication Data
US 2024/0183400 A1    Jun. 6, 2024

(30) Foreign Application Priority Data
Mar. 31, 2021    (JP) ................. 2021-062354

(51) Int. Cl.
*F16C 19/18*    (2006.01)
*F16C 33/58*    (2006.01)
(Continued)

(52) U.S. Cl.
CPC ............ *F16C 33/585* (2013.01); *F16C 19/18* (2013.01); *F16C 33/60* (2013.01); *F16C 43/06* (2013.01); *F16H 25/2204* (2013.01)

(58) Field of Classification Search
CPC ...... F16C 19/18; F16C 33/581; F16C 33/585; F16C 33/60; F16C 43/06; F16H 25/2204
See application file for complete search history.

(56) References Cited

U.S. PATENT DOCUMENTS

| 1,135,177 A | 4/1915 | Graham |
| 5,086,851 A | 2/1992 | Beasley |
| (Continued) | | |

FOREIGN PATENT DOCUMENTS

| DE | 102010060326 A1 * | 6/2011 | .............. F16C 19/18 |
| JP | 61-166228 U | 10/1986 | |
| (Continued) | | | |

OTHER PUBLICATIONS

DE102010060326_A1_Description.*
(Continued)

*Primary Examiner* — Phillip A Johnson
(74) *Attorney, Agent, or Firm* — Sughrue Mion, PLLC (57) ABSTRACT

In a multi-row bearing, an inner ring raceway groove at one end portion in an axial direction is formed over groove shoulders on both sides in the axial direction with respect to a groove bottom, and an inner ring raceway groove at an intermediate portion in the axial direction is formed over a groove shoulder on one side in the axial direction from a groove bottom. In addition, an outer ring raceway groove at the other end portion in the axial direction is formed over groove shoulders on both sides in the axial direction with respect to a groove bottom, and an outer ring raceway groove at the intermediate portion in the axial direction is formed over a groove shoulder on one side in the axial direction from a groove bottom.

4 Claims, 5 Drawing Sheets

(51) Int. Cl.
  *F16C 33/60*  (2006.01)
  *F16C 43/06*  (2006.01)
  *F16H 25/22*  (2006.01)

(56) References Cited

U.S. PATENT DOCUMENTS 9,206,846 B2    12/2015  Fehr et al.
2021/0388866 A1*  12/2021  Shaikh .................. F16C 33/583

FOREIGN PATENT DOCUMENTS

| JP | 4-262120 A | 9/1992 |
| JP | 2001-163231 A | 6/2001 |
| JP | 2002-39202 A | 2/2002 |
| WO | WO-2020145244 A1 * | 7/2020 |

OTHER PUBLICATIONS

International Search Report (PCT/ISA/210) issued Jun. 14, 2022 by the International Searching Authority in counterpart International Application No. PCT/JP2022/015548.
Written Opinion (PCT/ISA/237) issued Jun. 14, 2022 by the International Searching Authority in counterpart International Application No. PCT/JP2022/015548.
Extended European Search Report issued Oct. 7, 2024 by the European Patent Office in European Patent Application No. 22780945.6.

* cited by examiner

MEASURE DISTANCE BETWEEN CORES OF STEEL BALLS

MULTI-ROW BEARING AND BEARING UNIT

CROSS-REFERENCE TO RELATED APPLICATIONS

This application is a National Phase Entry of PCT International Application No. PCT/JP2022/015548 filed on Mar. 29, 2022, which claims priority to Japanese Patent Application No. 2021-062354 filed on Mar. 31, 2021, the contents of all of which are incorporated herein by reference in their entirety.

TECHNICAL FIELD

The present invention relates to a multi-row bearing and a bearing unit, and more particularly, to a multi-row bearing and a bearing unit in which an axial dimension between raceway grooves of the multi-row bearing can be easily and accurately measured so that the raceway grooves can be machined with high accuracy.

BACKGROUND ART

Patent Literature 1 discloses a multi-row bearing having multiple rows of raceway grooves in inner and outer rings of a bearing, in which each raceway groove of the inner ring is formed over groove shoulders on both sides in an axial direction of the raceway groove, and each raceway groove of the outer ring is formed over a groove shoulder on one side in the axial direction of the raceway groove. In addition, a thrust and radial bearing is disclosed in which the inner ring is inserted into the outer ring, balls are inserted between raceway grooves from a radial hole opened in the outer ring, and then the outer ring is moved in the axial direction to be assembled.

In raceway groove machining of such a multi-row bearing, it is required that axial dimensions of the raceway grooves of the inner ring and the outer ring coincide with each other, and therefore the raceway grooves are machined while measuring the axial dimension between the raceway grooves and adjusting the axial dimension between the raceway grooves to a target dimension. Accordingly, the measurement is usually performed many times during machining, and therefore it is required that the measurement can be easily and accurately performed at a short time. When the measurement cannot be performed by a simple method, a workpiece is once removed from a processing machine and measured, and the workpiece is again attached to the processing machine to be machined, which is not preferable because the processing method requires very cost and labor.

Figure 3A:
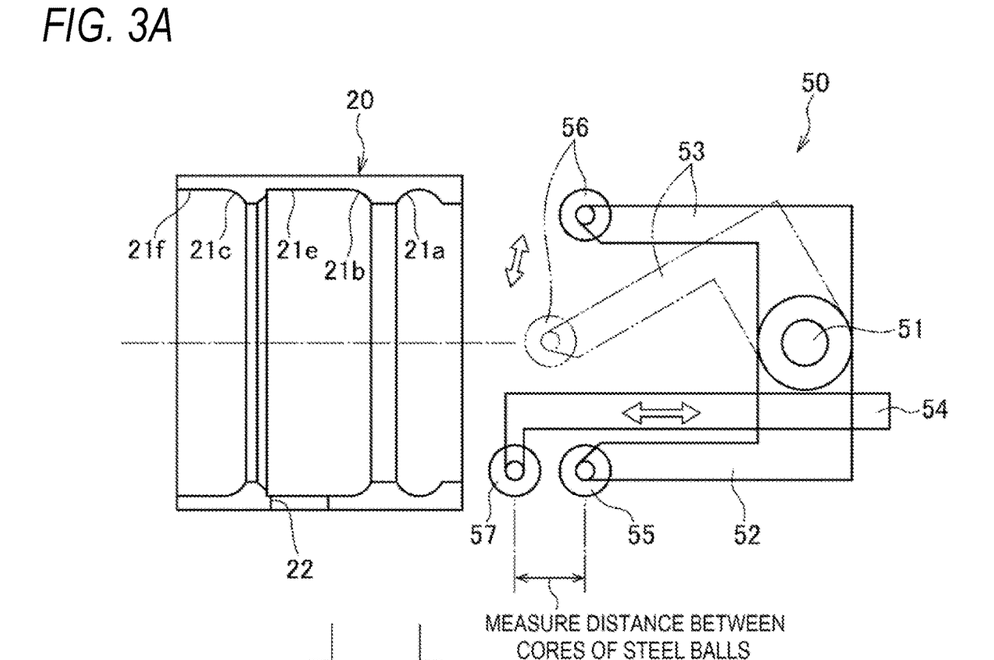
FIG. 3A is a side view of a measuring tool for measuring an axial dimension between raceway grooves of the multi-row bearing.
Figure 3B:
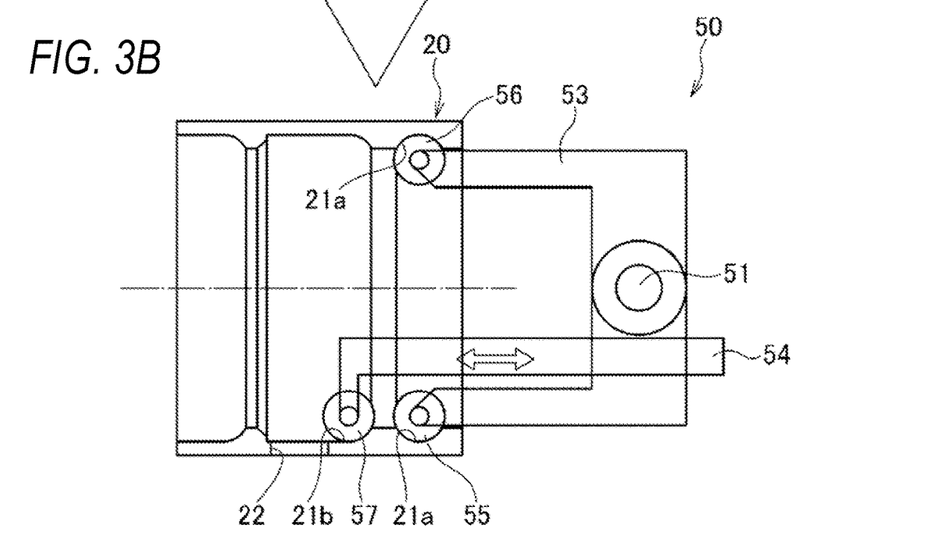
FIG. 3B is a side view illustrating a state where the axial dimension between the raceway grooves of the multi-row bearing is measured by the measuring tool.

As a measuring tool that can easily perform the measurement at a short time, for example, there is a measuring tool 50 having a structure illustrated in FIGS. 3A and 3B. As will be described in detail later, the measuring tool 50 is configured such that the measuring tool 50 is stably held by engaging a pair of steel balls 55, 56 with a raceway groove serving as a measurement reference, and then an axial distance between the raceway grooves is measured by pressing a gauge head 57 against a raceway groove to be measured. In order to stably hold the measuring tool 50, the reference raceway groove is preferably formed on both sides of a groove bottom.

CITATION LIST

Patent Literature

Patent Literature 1: JPH04-262120A

SUMMARY OF INVENTION

Technical Problem

However, according to the bearing of Patent Literature 1, since each raceway groove of the outer ring is formed only from the groove bottom to the groove shoulder on the one side in the axial direction, the measuring tool 50 for measuring the dimension between the raceway grooves cannot be stably installed, a measurement value becomes unstable, and it becomes difficult to machine the outer ring having high dimensional accuracy between the raceway grooves.

The present invention has been made in view of the above-described problems, and an object of the present invention is to provide a multi-row bearing and a bearing unit including the multi-row bearing in which an axial dimension between raceway grooves can be accurately and easily measured at a short time, and the raceway grooves can be further machined with high dimensional accuracy.

Solution to Problem

The above object of the present invention is achieved by the following configuration [1] relating to a multi-row bearing.
  [1] A multi-row bearing including:
  an inner ring having multiple rows of inner ring raceway grooves;
  an outer ring having multiple rows of outer ring raceway grooves; and
  a plurality of balls disposed between the multiple rows of inner ring raceway grooves and the multiple rows of outer ring raceway grooves,
  wherein the inner ring raceway groove at one end portion in an axial direction is formed over groove shoulders on both sides in the axial direction with respect to a groove bottom,
  wherein the inner ring raceway groove at an intermediate portion in the axial direction is formed over a groove shoulder on one side in the axial direction from a groove bottom,
  wherein the outer ring raceway groove at another end portion in the axial direction is formed over groove shoulders on both sides in the axial direction with respect to a groove bottom, and
  wherein the outer ring raceway groove at the intermediate portion in the axial direction is formed over a groove shoulder on one side in the axial direction from a groove bottom.

The above object of the present invention is achieved by the following configuration [2] relating to a bearing unit.
  [2] A bearing unit including: a ball screw mechanism; and the multi-row bearing according to the above [1],
  wherein a nut of the ball screw mechanism constitutes the inner ring.

Advantageous Effects of Invention

According to the multi-row bearing of the present invention, the axial dimension between the raceway grooves can be accurately and easily measured at a short time, and accordingly, the raceway grooves of the multi-row bearing having high dimensional accuracy between the raceway grooves and stable quality can be machined. In addition, it is possible to obtain a compact and inexpensive bearing unit that includes the multi-row bearing and can cope with a high load.

DESCRIPTION OF EMBODIMENTS

Hereinafter, embodiments of a multi-row bearing according to the present invention will be described in detail with reference to the drawings.

First Embodiment

Figure 1:
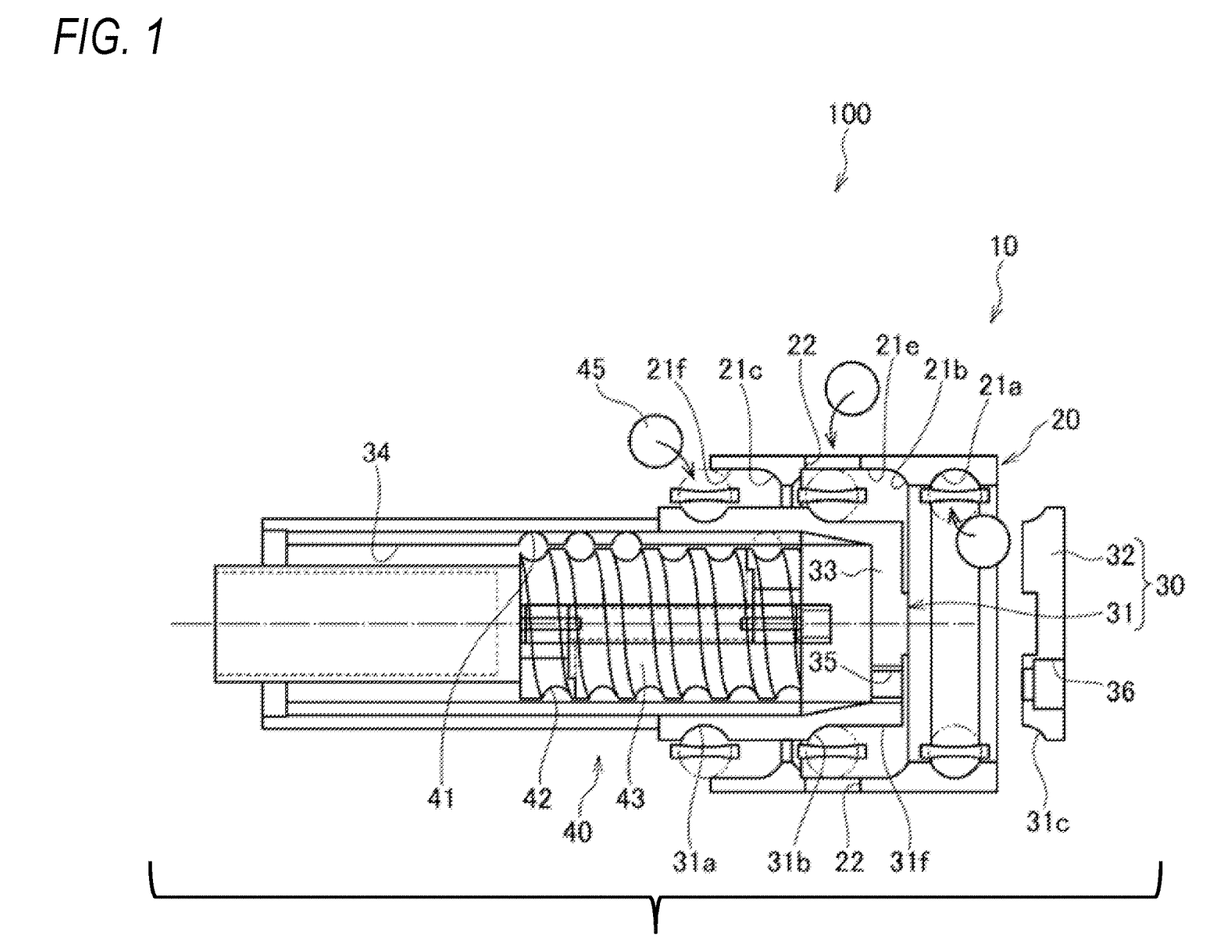
FIG. 1 is a cross-sectional view illustrating a state before a multi-row bearing having three rows of raceway grooves is assembled.
Figure 2:
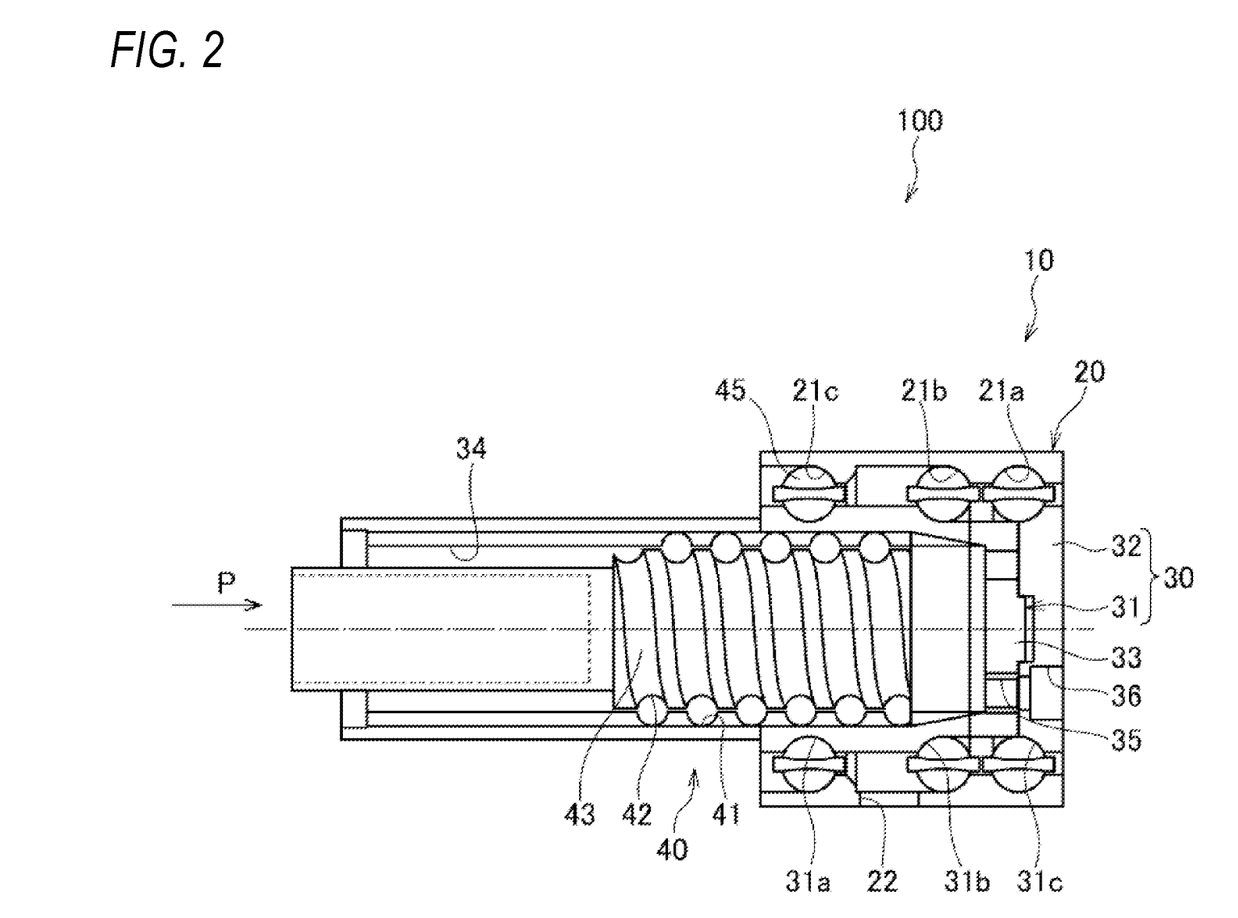
FIG. 2 is a cross-sectional view illustrating a state after the multi-row bearing illustrated in FIG. 1 is assembled.

FIG. 1 is a cross-sectional view illustrating a state before a multi-row bearing according to a first embodiment of the present invention is assembled, and FIG. 2 is a cross-sectional view illustrating a state after the multi-row bearing is assembled. In the following description, a left direction and a right direction in the drawings are referred to as one side and the other side, respectively.

As illustrated in FIGS. 1 and 2, a bearing unit 100 according to the first embodiment includes a multi-row bearing 10 and a ball screw mechanism 40 using an inner ring 30 of the multi-row bearing 10 as a nut.

The multi-row bearing 10 according to the present embodiment includes an outer ring 20 having three rows of outer ring raceway grooves 21a, 21b, and 21c on an inner peripheral surface thereof, an inner ring 30 having three rows of inner ring raceway grooves 31a, 31b, and 31c on an outer peripheral surface thereof, and a plurality of balls 45 disposed between the outer ring raceway grooves 21a, 21b, and 21c and the inner ring raceway grooves 31a, 31b, and 31c so as to be rollable between the outer ring raceway grooves 21a, 21b, and 21c and the inner ring raceway grooves 31a, 31b, and 31c.

The outer ring raceway groove 21a formed at an end portion on the other side in an axial direction of the outer ring 20 is formed over groove shoulders on both sides in the axial direction. Specifically, the outer ring raceway groove 21a is formed in left-right line symmetry with respect to a groove bottom.

In addition, the two outer ring raceway grooves 21b, 21c formed at an intermediate portion in the axial direction and an end portion on one side in the axial direction of the outer ring 20 are each formed over a groove shoulder on the one side (the other side) in the axial direction from a groove bottom. Specifically, the raceway grooves 21b, 21c are formed only on the other side with respect to the groove bottom. That is, the outer ring raceway groove 21a has a raceway groove having a substantially semicircular cross section, and the outer ring raceway grooves 21b, 21c each have a raceway groove having a substantially ¼ circular cross section formed on the other side of the outer ring 20.

A cylindrical surface 21e continuous from the groove bottom of the outer ring raceway groove 21b is formed between the outer ring raceway groove 21b and the outer ring raceway groove 21c. Further, a cylindrical surface 21f continuous from the groove bottom of the outer ring raceway groove 21c is also formed on one side in the axial direction of the outer ring raceway groove 21c. An inner diameter of the groove bottom of the outer ring raceway groove 21b and an inner diameter of the cylindrical surface 21e, and an inner diameter of the groove bottom of the outer ring raceway groove 21c and an inner diameter of the cylindrical surface 21f are substantially the same. The cylindrical surface 21e is provided with an opening portion 22 penetrating in a radial direction. The inner diameters of the cylindrical surfaces 21e, 21f may be different from the inner diameters of the outer ring raceway grooves 21b, 21c as long as the cylindrical surfaces 21e, 21f do not interfere with balls when the balls are assembled as described later.

The inner ring 30 is also a nut of the ball screw mechanism 40 as will be described later, and is a divided inner ring including a substantially bottomed cylindrical inner ring main body 31 that is long in the axial direction and has a bottomed hole 34 having a bottom portion 33 at the end portion on the other side, and a pressing lid 32. The inner ring raceway groove 31a formed at end portion on one side of the inner ring main body 31 is formed over groove shoulders on both sides in the axial direction. Specifically, the inner ring raceway groove 31a is formed in left-right line symmetry with respect to a groove bottom.

The inner ring raceway groove 31b formed at an intermediate portion in the axial direction of the inner ring 30 extends from a groove bottom to the groove shoulder on the one side (one side) in the axial direction. Specifically, the raceway groove is formed only on one side with respect to the groove bottom. A cylindrical surface 31f continuous from the groove bottom of the inner ring raceway groove 31b is formed on the other side of the inner ring raceway groove 31b. An outer diameter of the groove bottom of the inner ring raceway groove 31b and an outer diameter of the cylindrical surface 31f are substantially the same. The outer diameter of the cylindrical surface 31f may be different from the outer diameter of the inner ring raceway groove 31b as long as the cylindrical surface 31f does not interfere with balls when the balls are assembled as described later.

The pressing lid 32 is a member fixed to the inner ring main body 31 to form the inner ring raceway groove 31c, and a raceway groove having a substantially ¼ circular cross section and serving as the inner ring raceway groove 31c is formed in an outer diameter corner portion on one side. Further, the pressing lid 32 is provided with a screw hole 36 through which a bolt (not illustrated) for screwing into a female screw 35 provided at the bottom portion 33 of the inner ring main body 31 to fix the pressing lid 32 to the inner ring main body 31 is inserted.

Although not illustrated in detail, a ball screw groove 41 (nut-side ball screw groove) of the ball screw mechanism 40 is formed on an inner peripheral surface of the bottomed hole 34 of the inner ring main body 31, and a ball screw shaft 43 formed with a ball screw groove 42 (screw shaft-side ball screw groove) formed on an outer peripheral surface thereof is rotatably accommodated in the bottomed hole 34. A plurality of balls (not illustrated) are disposed between the ball screw groove 41 of the inner ring main body 31, that is, the nut and the ball screw groove 42 of the ball screw shaft 43 so as to be freely rotatable therebetween.

That is, the bearing unit 100 is formed by combining the ball screw mechanism 40 including the inner ring main body 31, which is provided with the ball screw groove 41 on the inner peripheral surface and functions as the nut of the ball screw mechanism 40, the ball screw shaft 43, and the balls (not illustrated) with the multi-row bearing 10.

Next, a method for assembling the outer ring 20, the inner ring 30, and the plurality of balls 45 will be described. First, as illustrated in FIG. 1, the outer ring 20 is placed on the inner ring 30 in a state of being slightly shifted to the other side. In this state, the opening portion 22 of the outer ring 20 is positioned corresponding to the inner ring raceway groove 31*b*.

Then, the plurality of balls 45 are loaded between the inner ring raceway groove 31*a* and the cylindrical surface 21*f* of the outer ring 20 from one side. The plurality of balls 45 are loaded between the inner ring raceway groove 31*b* and the cylindrical surface 21*e* from the opening portion 22. Further, the plurality of balls 45 are loaded into the outer ring raceway groove 21*a* from the other side, and are pressed by the pressing lid 32.

Next, as illustrated in FIG. 2, the outer ring 20 is slid to one side together with the pressing lid 32, gaps between the balls 45 and the outer ring raceway groove 21*a* and the inner ring raceway groove 31*c* are adjusted to a predetermined value by the pressing lid 32, a bolt (not illustrated) inserted into the screw hole 36 of the pressing lid 32 is screwed into the female screw 35, and the pressing lid 32 is fixed to the inner ring main body 31. Accordingly, the plurality of balls 45 are disposed between the respective raceway grooves, that is, between the inner ring raceway groove 31*a* and the outer ring raceway groove 21*c*, between the inner ring raceway groove 31*b* and the outer ring raceway groove 21*b*, and between the inner ring raceway groove 31*c* and the outer ring raceway groove 21*a* so as to be rollable therebetween, whereby the multi-row bearing 10 of three rows are assembled.

Although not illustrated in detail, when in a state where the rotation of one (for example, the ball screw shaft 43) of the inner ring 30, that is, the nut or the ball screw shaft 43 is restrained, the other one (for example, the inner ring 30) is rotationally driven, the ball screw shaft 43 moves in the axial direction relative to the inner ring 30. Here, when a load toward the other side in the axial direction is applied to an end portion of the ball screw shaft 43 on the one side, a load P indicated by an arrow in the drawing acts on the ball screw shaft 43. Since the load P is received by the multi-row bearing 10 having multiple rows of raceway grooves, the large load P can be supported.

In order to smoothly operate the multi-row bearing 10 configured as described above, it is required that axial positions of three rows of the outer ring raceway grooves 21*a*, 21*b*, and 21*c* and three rows of the inner ring raceway grooves 31*a*, 31*b*, and 31*c* coincide with each other with high accuracy. In other words, machining accuracy of the outer ring raceway grooves 21*a*, 21*b*, and 21*c* and the inner ring raceway grooves 31*a*, 31*b*, and 31*c* greatly affects a performance of the multi-row bearing 10.

Since the inner ring raceway grooves 31*a*, 31*b*, and 31*c* are formed on an outer peripheral side of the inner ring 31, comparative measurement and machining are easy, but since the outer ring raceway grooves 21*a*, 21*b*, and 21*c* are formed on an inner peripheral side of the outer ring 20, the outer ring raceway grooves 21*a*, 21*b*, and 21*c* are difficult to be machined, and it is necessary to machining the raceway grooves while measuring and adjusting the axial dimension between the raceway grooves. Accordingly, the dimension measurement between the raceway grooves needs to be performed many times during machining, and the measuring tool is required to be able to perform the measurement easily and accurately at a short time.

The axial dimension between the raceway grooves is measured by a dedicated measuring tool 50 as illustrated in FIGS. 3A and 3B. Hereinafter, a case where an axial dimension between raceway grooves of the outer ring 20 is measured will be described as an example.

As illustrated in FIG. 3A, the measuring tool 50 includes a fixed arm 52 fixed to a support shaft 51, a movable arm 53 swingable about the support shaft 51, and a measuring arm 54 provided to be slidable with respect to the fixed arm 52. Steel balls 55, 56 having the same size as the balls 45 used in the multi-row bearing 10 are attached to distal ends of the fixed arm 52 and the movable arm 53, and a gauge head (steel ball) 57 having the same size as the balls 45 used in the multi-row bearing 10 is similarly attached to a distal end of the measuring arm 54.

By swinging the movable arm 53 with respect to the fixed arm 52, an interval between the steel balls 55, 56 is narrowed and inserted into the inner diameter of the outer ring 20. Then, as illustrated in FIG. 3B, the steel balls 55, 56 of the fixed arm 52 and the movable arm 53 are fitted into the pair of outer ring raceway grooves 21*a* of the outer ring 20 facing each other, and the measuring tool 50 is stably held. That is, the outer ring raceway groove 21*a* of the outer ring 20 whose raceway groove is formed on both sides with respect to the groove bottom serves as a reference groove for measuring a distance between the raceway grooves.

In a state where the measuring tool 50 is stably held by the outer ring 20, the movable arm 53 is extended and contracted in an arrow direction to engage the gauge head 57 with the outer ring raceway groove 21*b* or 21*c* to be measured, and the axial dimension between the raceway grooves is measured from a movement distance of the measuring arm 54. In this way, by measuring the axial distances of the remaining outer ring raceway grooves 21*b*, 21*c* with high accuracy with reference to the outer ring raceway groove 21*a* whose raceway groove is formed on both sides with respect to the groove bottom, the outer ring raceway grooves 21*b*, 21*c* can be accurately machined with reference to the outer ring raceway groove 21*a*.

Accordingly, it is not necessary to remove the outer ring 20 during machining from a machining device every time the axial dimension between the raceway grooves is measured, working efficiency is improved, and the outer ring raceway groove can be accurately machined.

Second Embodiment

Figure 4:
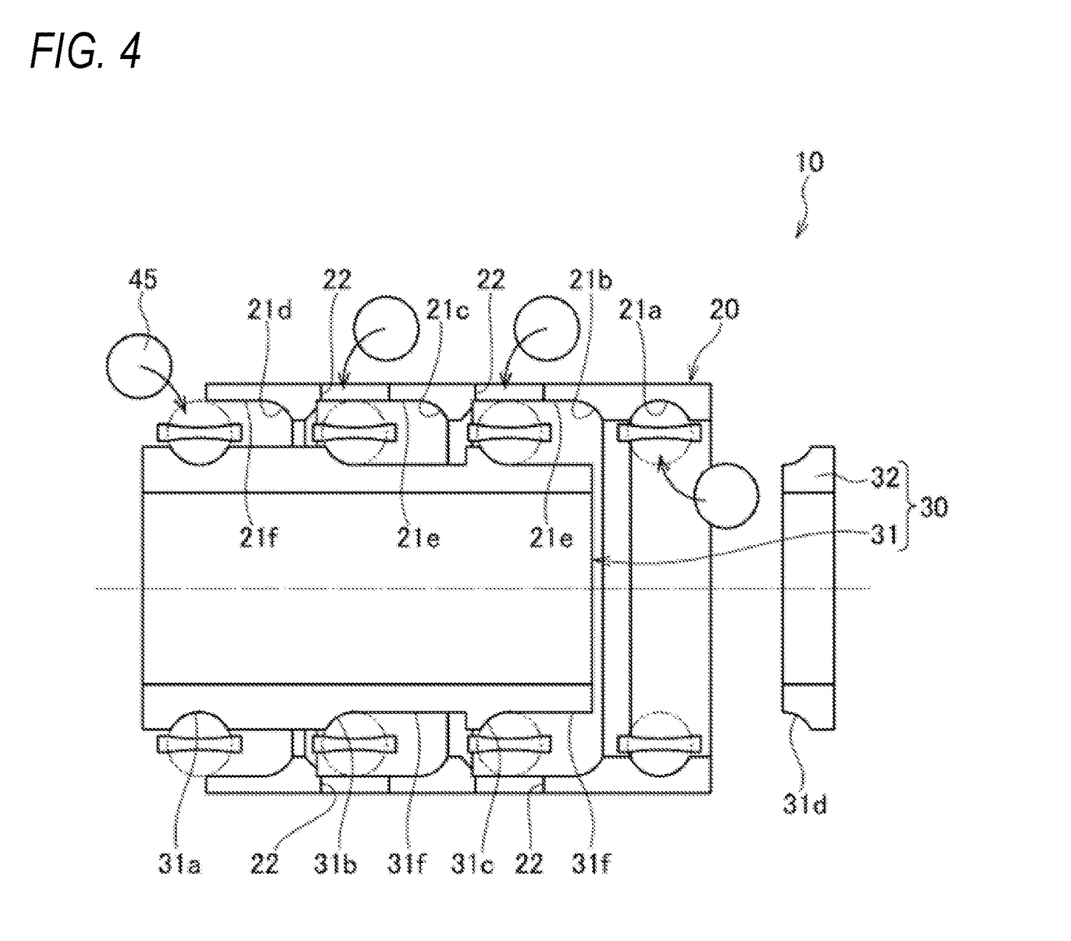
FIG. 4 is a cross-sectional view illustrating a state before a multi-row bearing having four rows of raceway grooves is assembled.
Figure 5:
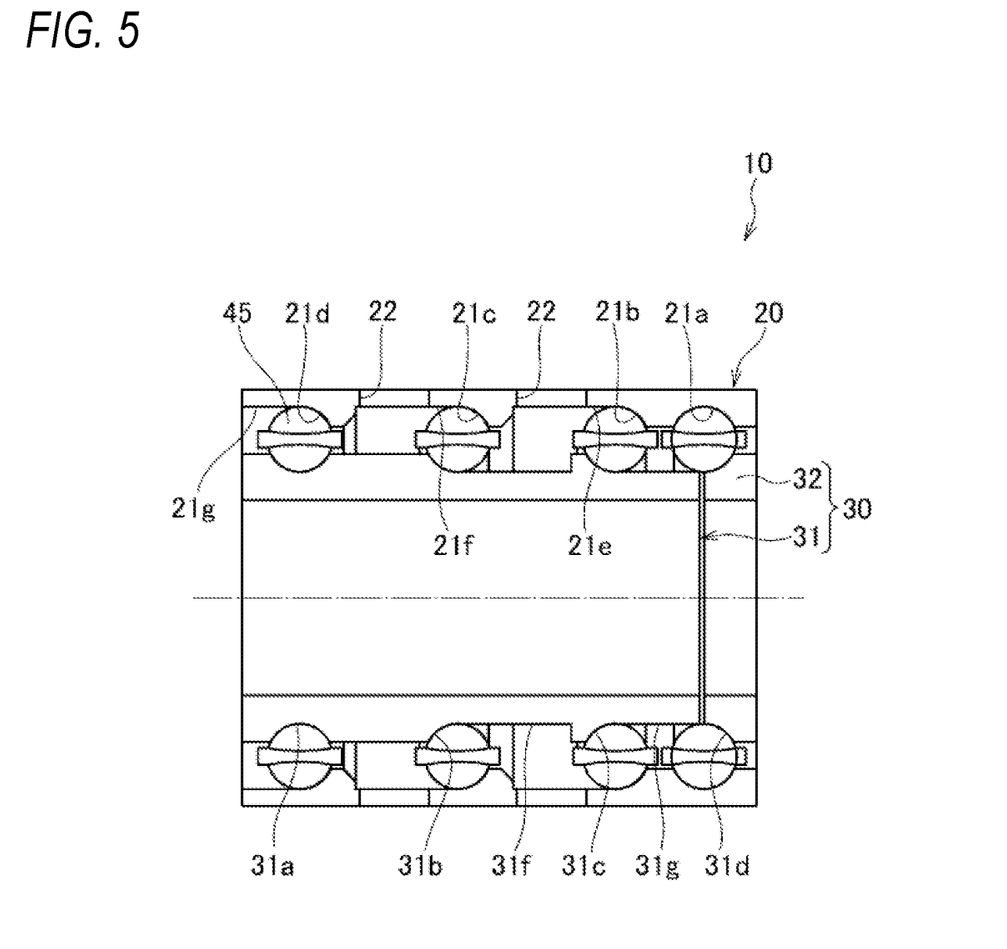
FIG. 5 is a cross-sectional view illustrating a state after the multi-row bearing illustrated in FIG. 4 is assembled.

Next, the multi-row bearing 10 according to a second embodiment of the present invention will be described with reference to FIGS. 4 and 5. In the multi-row bearing 10 according to the second embodiment, four rows of outer ring raceway grooves 21*a*, 21*b*, 21*c*, and 21*d* are formed on the inner peripheral surface of the outer ring 20, and four rows of inner ring raceway grooves 31*d*, 31*c*, 31*b*, and 31*a* are formed on the outer peripheral surface of the inner ring 30 so as to face the outer ring raceway grooves 21*a*, 21*b*, 21*c*, and 21*d*.

Among the outer ring raceway grooves 21*a*, 21*b*, 21*c*, and 21*d* of the outer ring 20, the outer ring raceway grooves 21*b*, 21c located between the outer ring raceway grooves 21a, 21d formed at an end portion on the one side and an end portion on the other side are respectively formed with cylindrical surfaces 21e continuous from the groove bottoms of the outer ring raceway grooves 21b, 21c, and the two cylindrical surfaces 21e are provided with the opening portions 22 penetrating in the radial direction.

Also in the multi-row bearing 10 according to the second embodiment, the axial dimension between the raceway grooves can be accurately measured at a short time by the measuring tool 50 illustrated in FIG. 3 with reference to the outer ring raceway groove 21a. Accordingly, the other outer ring raceway grooves 21b, 21c, and 21d can be accurately machined with reference to the outer ring raceway groove 21a.

Although not shown in the drawings, a method for assembling the outer ring 20, the inner ring 30, and the plurality of balls 45 is the same as that of the multi-row bearing 10 according to the first embodiment in that the ball screw mechanism 40 is configured by using the inner ring 30 as the nut and disposing the ball screw shaft 43 inside the nut. In this case, since the multi-row bearing 10 according to the second embodiment has four rows of raceway grooves, it is possible to support a larger load than the multi-row bearing 10 according to the first embodiment.

Since the other parts are the same as those of the multi-row bearing 10 according to the first embodiment of the present invention, the same parts are denoted by the same reference numerals or corresponding reference numerals, and the description thereof will be simplified or omitted.

The present invention is not limited to the embodiments described above, and modifications, improvements, and the like can be appropriately made.

As described above, the following matters are disclosed in the present specification.

(1) A multi-row bearing including:
an inner ring having multiple rows of inner ring raceway grooves;
an outer ring having multiple rows of outer ring raceway grooves; and
a plurality of balls disposed between the multiple rows of inner ring raceway grooves and the multiple rows of outer ring raceway grooves,
wherein the inner ring raceway groove at one end portion in an axial direction is formed over groove shoulders on both sides in the axial direction with respect to a groove bottom,
wherein the inner ring raceway groove at an intermediate portion in the axial direction is formed over a groove shoulder on one side in the axial direction from a groove bottom,
wherein the outer ring raceway groove at another end portion in the axial direction is formed over groove shoulders on both sides in the axial direction with respect to a groove bottom, and
wherein the outer ring raceway groove at the intermediate portion in the axial direction is formed over a groove shoulder on one side in the axial direction from a groove bottom.

According to this configuration, the axial dimension between the raceway grooves can be accurately and easily measured at a short time, and accordingly, the raceway grooves of the multi-row bearing having high dimensional accuracy between the raceway grooves and stable quality can be machined.

(2) The multi-row bearing according to (1),
wherein an opening portion penetrating in a radial direction is provided in a cylindrical surface of the outer ring in a row of the intermediate portion in the axial direction.

According to this configuration, the balls can be easily loaded into the raceway groove at the intermediate portion in the axial direction from the opening portion, and the multi-row bearing can be easily assembled.

(3) The multi-row bearing according to (1) or (2),
wherein the outer ring raceway groove at the intermediate portion in the axial direction has a cylindrical surface on a side opposite to the groove shoulder with respect to the groove bottom, and
wherein the inner ring raceway groove at the intermediate portion in the axial direction has a cylindrical surface on a side opposite to the groove shoulder with respect to the groove bottom.

According to this configuration, since the outer ring is slid in the axial direction, the balls loaded from the opening portion can be held between the outer ring raceway groove and the inner ring raceway groove.

(4) The multi-row bearing according to any one of (1) to (3),
wherein the inner ring raceway groove at the other end portion in the axial direction is formed by a divided inner ring.

According to this configuration, it is possible to easily form the inner ring raceway groove formed at the end portion on the other side of the multi-row bearing.

(5) A bearing unit including:
a ball screw mechanism; and
the multi-row bearing according to any one of 1 to 4,
wherein a nut of the ball screw mechanism constitutes the inner ring.

According to this configuration, since the multi-row bearing and the ball screw mechanism are combined, it is possible to configure the bearing unit that is movable in the axial direction and supports a large thrust load.

Although various embodiments have been described above with reference to the drawings, the present invention is not limited to such examples. It will be apparent to those skilled in the art that various changes and modifications may be conceived within the scope of the claims, and it is also understood that the various changes and modifications belong to the technical scope of the present invention. In addition, constituent elements in the embodiments described above may be combined freely within a range not departing from the spirit of the present invention.

The invention claimed is:

1. A multi-row bearing comprising:
an inner ring having multiple rows of inner ring raceway grooves;
an outer ring having multiple rows of outer ring raceway grooves; and
a plurality of balls disposed between the multiple rows of inner ring raceway grooves and the multiple rows of outer ring raceway grooves,
wherein the multiple rows of inner raceway grooves comprise an inner ring raceway groove at one end portion in an axial direction formed over groove shoulders on both sides in the axial direction with respect to a respective groove bottom, and an inner ring raceway groove at an intermediate portion in the axial direction formed over a groove shoulder on one side in the axial direction from a respective groove bottom,
wherein the multiple rows of outer raceway groove comprise an outer ring raceway groove at another end portion in the axial direction formed over groove shoulders on both sides in the axial direction with respect to a respective groove bottom, and an outer ring raceway groove at the intermediate portion in the axial direction formed over a groove shoulder on one side in the axial direction from a respective groove bottom, wherein the outer ring raceway groove at the intermediate portion in the axial direction has a cylindrical surface on a side opposite to the groove shoulder with respect to the respective groove bottom, and wherein the inner ring raceway groove at the intermediate portion in the axial direction has a cylindrical surface on a side opposite to the groove shoulder with respect to-the respective groove bottom.

2. The multi-row bearing according to claim 1,
wherein an opening portion penetrating in a radial direction is provided in a cylindrical surface of the outer ring in a row of the intermediate portion in the axial direction.

3. The multi-row bearing according to claim 1,
wherein the multiple rows of inner raceways groove further comprise an inner ring raceway groove at the other end portion in the axial direction formed by a divided inner ring.

4. A bearing unit comprising:
a ball screw mechanism; and
the multi-row bearing according to claim 1,
wherein a nut of the ball screw mechanism constitutes the inner ring.

\* \* \* \* \*